(12) United States Patent
Locke et al.

(10) Patent No.: US 10,052,853 B2
(45) Date of Patent: Aug. 21, 2018

(54) DURABLE POLYMERIC PANELS AND DEVICES EXHIBITING ANTIBALLISTIC CAPACITY MADE THEREFROM

(75) Inventors: Ralph J. Locke, Woodland, WA (US); Dudley J. Primeaux, II, Woodland, WA (US); Jason Darley, Woodland, WA (US); Paul Norris, Woodland, WA (US); Craig Halquist, Woodland, WA (US); Dwayne Starnes, Woodland, WA (US); Shawn Alexander, Woodland, WA (US)

(73) Assignee: LIFEPORT, INC., Woodland, WA (US)

( * ) Notice: Subject to any disclaimer, the term of this patent is extended or adjusted under 35 U.S.C. 154(b) by 666 days.

(21) Appl. No.: 12/797,447

(22) Filed: Jun. 9, 2010

(65) Prior Publication Data
US 2013/0098232 A1 Apr. 25, 2013

Related U.S. Application Data

(63) Continuation-in-part of application No. 12/634,616, filed on Dec. 9, 2009, and a continuation-in-part of
(Continued)

(51) Int. Cl.
*B32B 27/28* (2006.01)
*B32B 27/08* (2006.01)
(Continued)

(52) U.S. Cl.
CPC .............. *B32B 27/28* (2013.01); *B32B 27/08* (2013.01); *F41H 5/04* (2013.01); *F41H 7/00* (2013.01);
(Continued)

(58) Field of Classification Search
CPC . B32B 27/28; B32B 27/08; F41H 7/00; F41H 5/04; F42D 5/045; Y10T 428/31551; Y10T 428/239
(Continued)

(56) References Cited

U.S. PATENT DOCUMENTS 4,585,683 A * 4/1986 Curnow .......................... 428/71
5,118,728 A 6/1992 Primeaux
(Continued)

FOREIGN PATENT DOCUMENTS

DE 3627485 A1 2/1988
EP 0304083 A2 2/1989
(Continued)

OTHER PUBLICATIONS

Author Unknown; Date Captured: Aug. 6, 2016; DuPont Kevlar® Brand Literature; Captured from website of DuPont USA.*
(Continued)

*Primary Examiner* — Nathan L Van Sell
(74) *Attorney, Agent, or Firm* — Cantor Colburn LLP (57) ABSTRACT

A polymeric coating composition for use in overlaying at least a portion of a substrate element composed of a plural component polymeric system composed of a reactive blend of at least one first component and at least one second component, wherein the first component essentially of a polymer and/or blend of polymers present in an amount sufficient to impart a predetermined amount of tensile strength, hardness, flexibility and adhesive strength to the resulting polymeric coating, and the second component is an isocyanate or isocyanate quasi-prepolymer. The substrate element is a blast-resistant polymeric material having low surface energy and/or low reactivity at or near the surface of the substrate. Also disclosed is a blast and/or ballistic-resistant construction element composed of a structure having the aforementioned polymeric material thereover. The polymeric material has a substrate matrix containing at least one of ultrahigh molecular weight polyethylene, aramid materials, and the like.

16 Claims, 3 Drawing Sheets

Related U.S. Application Data application No. PCT/US2009/067478, filed on Dec. 10, 2009.

(51) Int. Cl.
| | | |
|---|---|---|
| *F41H 7/00* | (2006.01) | |
| *F41H 5/04* | (2006.01) | |
| *F42D 5/045* | (2006.01) | |

(52) U.S. Cl.
CPC .......... *F42D 5/045* (2013.01); *Y10T 428/239* (2015.01); *Y10T 428/31551* (2015.04)

(58) Field of Classification Search
USPC ........................................................ 428/76
See application file for complete search history.

(56) References Cited

U.S. PATENT DOCUMENTS

| | | | |
|---|---|---|---|
| 5,189,075 | A | 2/1993 | Zimmerman et al. |
| 5,218,005 | A | 6/1993 | Zimmerman et al. |
| 5,496,911 | A | 3/1996 | Smith |
| 5,990,036 | A | 11/1999 | Deviny |
| 6,046,295 | A | 4/2000 | Frisch, Jr. et al. |
| 6,069,192 | A | 5/2000 | Shalaby et al. |
| 6,291,019 | B1 | 9/2001 | Locke et al. |
| 6,881,774 | B2 | 4/2005 | Schrinner et al. |
| 6,951,162 | B1 * | 10/2005 | Shockey et al. ............. 89/36.11 |
| 7,493,844 | B2 * | 2/2009 | Martin ........................ 89/36.07 |
| 2002/0001678 | A1 | 1/2002 | Locke et al. |
| 2006/0189750 | A1 | 8/2006 | Maier et al. |
| 2006/0205909 | A1 | 9/2006 | O'Brien |
| 2006/0275595 | A1 | 12/2006 | Thies et al. |
| 2007/0098997 | A1 | 5/2007 | Younes et al. |
| 2008/0190278 | A1 * | 8/2008 | Martin ........................ 89/36.07 |

FOREIGN PATENT DOCUMENTS

| | | |
|---|---|---|
| EP | 0431728 A1 | 6/1991 |
| EP | 0688802 A1 | 12/1995 |
| EP | 2068111 A2 | 6/2009 |
| WO | 2004092495 A2 | 10/2004 |
| WO | WO2006037026 A2 | 4/2006 |
| WO | 2009151431 A1 | 12/2009 |

OTHER PUBLICATIONS

PCT International Search Report and Written Opinion of the International Searching Authority for International Application No. PCT/US2009067478, dated Aug. 13, 2010, 10 pages.

Author Unknown, Definition of Composite, Date Unknown, OSHA Technical Manual (online at www.osha.gov/dts/osta/otm/otm_iii/otm_iii_1.htm#iii:1_1).

Extended European Search Report for European Patent Application No. 09833810.6-10306 / 2361287 dated Feb. 10, 2014, 5 pages.

European Search Report for Application No. EP 11 16 9306 dated Dec. 10, 2015; 10 pgs.

European Patent Office Action for Application No. 09833810.6-1302; Ref: K78 771/8; dated Nov. 24, 2016; 7 pages.

EP Commincation Pursuant to Article 94(3) EPC; Application No. 09 833 810.6-1302; dated May 31, 2017, pp. 1-6.

EP Commincation Pursuant to Article 94(3) EPC; Application No. 09 833 810.6-1102; dated Feb. 5, 2018, pp. 1-13.

EP Communication Pursuant Article 94(3) EPC; Application No. 11 169 306.5-1011; dated Feb. 8, 2018; pp. 1-29.

Kruss, [online]; [retrieved on Feb. 2, 2018]; retrieved on the Internet https://www.kruss-scientific.com/de/service/schulung-theorie/substanzdaten/fluessigkeiten/Kruss, "Liquids, Values of Surface Tension of Liquids," Kruss, 2018, pp. 1-16.

Wenfeng Hao, et al., "Experimental Characterization of Contact Angle and Surface Energy on Aramid Fibers," Journal of Adhesion Science and Technology, 27:9, 2013, vol. 27, No. 9, pp. 1012-1022.

\* cited by examiner

DURABLE POLYMERIC PANELS AND DEVICES EXHIBITING ANTIBALLISTIC CAPACITY MADE THEREFROM

The present invention relates to a polymeric composition suitable for use in a variety of coating applications for use with friable or easily damaged substrate materials and/or materials having poor adhesion characteristics. More particularly, the composition disclosed herein relates to materials that can be used to coat blast resistant and/or shrapnel resistant panels and the like. The present invention also relates to durable polymeric panels coated with the polymeric coating and exhibiting enhanced wear resistance as well as antiballistic and/or blast resistant characteristics as well as devices employing the same.

Various polymeric materials have been proposed for use in a variety of useful objects including, but not limited to, producing blast and/or shrapnel-resistant structures and components. Materials such as ultra high molecular weight polyethylene (UHMWPE) based materials available under trade names such as DYNEEMA and SPECTRA, aramid materials such as KEVLAR and TWARON as well as polymeric matrixes that are fiber-reinforced with fiber materials including fibers formed from one or more of the aforementioned polymers and have been found to exhibit ballistic damping characteristics.

While exhibiting favorable physical and performance characteristics, including but not limited to high strength-to-weight ratios, high tensile and high impact resistance and resistance to shock loading, these materials are not without drawbacks and challenges. Among these are susceptibility to friability and surface chipping and flaking. It is also difficult to provide a durable, long lasting aesthetic or protective coated surface to such materials. Thus their usefulness in various applications is quite limited.

These drawbacks are particularly noteworthy in applications such as the production of blast and shrapnel armor for location in various wear and traffic regions for example in the floors and wall regions of aircraft and various motorized vehicles. Panels and other constructs formed from a suitable armor material such as DYNEEMA or SPECTRA are attached to the associated vehicle structure to provide protection to the occupants. While these panels impart elevated armored protection, the materials are susceptible to wear such as gouging, chipping and flaking as devices such as cargo and/or ordinance-related items are dragged or dropped on panel surfaces during routine use and operation. Additionally, panel surfaces made of such materials are difficult to paint or coat for to lower adhesion characteristics inherent in the polymeric materials composing the panels. In situations where the panels are exposed to elevated levels of foot traffic or heavy traffic with equipment or vehicle loading, it can be desirable to provide armor panels that provide even greater levels of durability and wear resistance.

Thus it would be desirable to provide a coating composition that could be employed to coat at least a portion of a surface a friable substrate material. It is also desirable to provide a coating composition that can be employed to encased a suitable substrate material and adhere thereto. It would also be desirable to provide a coating composition that can adhere effectively to a substrate having challenging adhesion characteristics. It would be desirable to provide a coating composition that could be employed with an associated armor panel or panels without unduly compromising the ballistic or resistance or blast resistance of the panel or other such structural component. It would also be desirable to provide a panel having antiballistic and/or blast resistant characteristics as well as enhanced wear resistance suitable for use in a device or vehicle. Finally, it would be desirable to provide a device or vehicle component with these characteristics and an associated vehicle having at least one armor panel.

SUMMARY

Disclosed herein is a polymeric coating composition for use in overlaying at least a portion of a substrate element, the composition is a plural component polymeric system suitable for spray application to a suitable substrate. The plural component system is composed of a reactive blend of at least one first component and at least one second component, wherein the first component consists essentially of a polymer and/or a blend of polymers present in an amount sufficient to impart a predetermined amount of tensile strength, hardness, flexibility and adhesive strength to the resulting polymeric coating and the second component is an isocyanate or isocyanate quasi-prepolymer. The substrate element can be composed, at least in part, of a blast-resistant polymeric material. The polymeric coating composition can be applied to various substrate materials having low surface energy and/or low reactivity at or near the surface of the substrate.

Also disclosed is a blast and/or ballistic-resistant construction element composed of a structure having the aforementioned polymeric material in overlaying attached relationship thereto. The polymeric material of the structure has a substrate matrix containing at least one of ultrahigh molecular weight polyethylene, aramid materials, and the like.

DESCRIPTION OF THE DRAWING

The description herein makes reference to the accompanying drawings in which like reference numerals refer to like parts throughout the several views and wherein.

DETAILED DESCRIPTION

Disclosed herein is a novel composition that can be employed advantageously as a coating composition on substrates that heretofore have been considered difficult to coat due to characteristics of the associated substrate material, including but not limited to, low surface energy and/or low reactivity of the polymeric material at or near the surface of the substrate.

Also disclosed herein is an armor panel element that is resistant to gauging and other surface deformation that exhibits antiballistic and/or blast resistant characteristics, that includes a polymeric substrate containing at least one of ultrahigh molecular weight polyethylene and aramids, the polymeric substrate having at least one face and a polymeric coating composition adhered in overlying relationship with at least a portion of the face. The polymeric coating composition is composed of a plural component system as disclosed herein.

The present disclosure also is directed to a device or vehicle having at least one panel composed of a polymeric substrate material and a coating layer in overlying adhered relationship with at least one face defined in the polymeric substrate. The coating layer includes a polymeric composition composed of a plural component polymeric system that is a reactive blend of at least one first component and at least one second component. The first component of the reactive blend consists essentially of a polymer and/or blend of polymers present in an amount sufficient to impart tensile strength hardness, flexibility, and adhesive strength to the resulting polymeric coating. The second component is an iso-cyanate or isocynate quasi-prepolymer.

The present disclosure also includes various armor embodiments having various reinforcements and supports to provide armor panels suitable for use in high traffic areas or areas that will experience heavy loading, wheeled equipment loading, etc.

The armor panels can be individually configured to fit or be fitted into the interior of the associated vehicle. The armor panels can be of various configurations to correspond to the desired interior of the corresponding vehicle. The nature and type of added panel reinforcements can vary depending upon the intended location in the associated vehicle. It is contemplated that the armor panels can be collated into a kit that can be installed in an associated vehicle as desired or required.

Non-limiting examples of polymeric substrate materials to which the composition disclosed herein can be applied include ultrahigh molecular weight polyetheylenes (UHM-WPE) as well as various aramids. Non-limiting examples of suitable UHMWPE materials include materials commercially available under the trade name DYNEEMA from DSM and SPECTRA from Honeywell. Non-limiting examples of suitable aramids include KEVLAR commercially available from DuPont. The polymeric substrate material can be formed into suitable structures that can be employed in various end-use applications.

It is contemplated that various formulations can be employed where UHMWPE is desired. These materials include, but are not limited to, materials such as DYNEEMA. Without being bound to any theory, it is believed that DYNEEMA materials are UHMWPE composites incorporating fibers of ultrahigh molecular weight polyethylene in a polymeric matrix.

Where desired or required, fibers of UHMWP can be laid parallel to one another in the same plane with the direction of fibers in each layer positioned at 90° to the direction of the fibers in adjacent layers. Such material is commercially available under the trade name DYNEEMA UD. Suitable materials can be formed as a compressed stack of monolayers with each monolayer containing unidirectionally oriented reinforcing fibers and a plastic matrix material. One nonlimiting example of a suitable material and process is outlined in U.S. Pat. No. 6,183,834, the specification of which is incorporated herein by reference.

Nonlimiting examples of suitable aramid-based materials suitable for use as the substrate material include materials commercially available under the trade name KEVLAR or TWARON.

Materials such as KEVLAR are believed to be para-aramid synthetic woven fibers that can be integrated into substrate panels. It is believed that various meta-aramids such as NOMEX may be utilized in certain applications.

In various non-limiting examples contemplated herein, the polymeric material can be formulated as armor plating and reinforcement to increase the ballistic and/or blast-resistance of the associated device or vehicle. As used herein, the term "ballistic resistance" is taken to mean the ability of the particular structure to prevent or impede the forward travel of ordinance through the polymeric material. Ballistic resistance can be taken to include but need not be limited to the ability of a material to prevent or impede forward travel of bullets, shrapnel and the like. "Blast resistance" is taken to mean resistance to concussive force associated with an explosion or similar event. Resistance can include mitigating and/or damping of the intensity of the event as well as any reduction in forward travel or other ill-effects.

Where ballistic resistance and/or blast resistance is desired or required, it is contemplated that that one or more of the substrate materials outlined above can be formulated as thick structure or component that will exhibit desired blast resistance and ballistic resistance characteristics. In certain applications and configurations, it has been found that such materials can stop forward progress of a 50 caliber ammunition round. Without being bound to any theory, it is believed that this is due, at least in part to, localized change-of-phase phenomena and characteristics of heat dissipation exhibited in the polymeric material.

The polymeric substrate material can be formed in any suitable structural configuration. In certain embodiments, it is contemplated that the substrate will be in the form of sheets or panels; however it is contemplated that other geometric forms can be successfully employed in certain embodiments. The substrate material can be formed by any suitable process such as various molding or extrusion processes and will have dimensions suitable for the desired end-use application contemplated. It is contemplated that the material will have suitable dimensional thickness to prevent or impede the transit of ballistic material and/or blast waves through the panel on to any internal space or structure.

Where the resulting construct is to be employed as armor for associated aeronautical or automotive vehicles, it is contemplated that the material will have suitable dimensional thickness to prevent or impede the passages of ballistic material such as armored rounds or shrapnel from transiting the panel. It is to be understood that the associated dimensions may vary from application to application depending upon the specifics of the end use. It is also understood that the specific dimensions and/or geometry of various panels will vary depending upon factors such as placement of a specific panel relative to the location and fixtures found in the associated vehicle. The thickness of the given panels will be sufficient to meet the ballistic requirements of a given situation. In certain embodiments, it is contemplated that the material fabricated in 1 inch panels will exhibit sufficient ballistic damping characteristics to stop the forward travel of a 50 caliber round of ammunition.

It is contemplated that the substrate material can be formulated in to panels of a thickness of approximately 2 inches in many end-use applications. The length and width dimensions can be varied to conform to the structure in which the panels are to be used. It is contemplated that the panels can be positioned and affixed to the associated structure in any manner that imparts enhanced ballistic and/or shock resistance in many end-use applications. By way of nonlimiting example, it is contemplated that a panel or panels can be attached to the floor and/or walls of the interior region of the various helicopter units to provide ballistic and/or blast protection to personnel and cargo contained therein. In various embodiments, it contemplated that the panels can be removably attached in overlying relationship to floor and/or wall structure or substructure existing in the helicopter unit. It is also contemplated that one or more of the panels can be placed in direct contact with joists or other structural members of the helicopter where desired or required.

Figure 1:
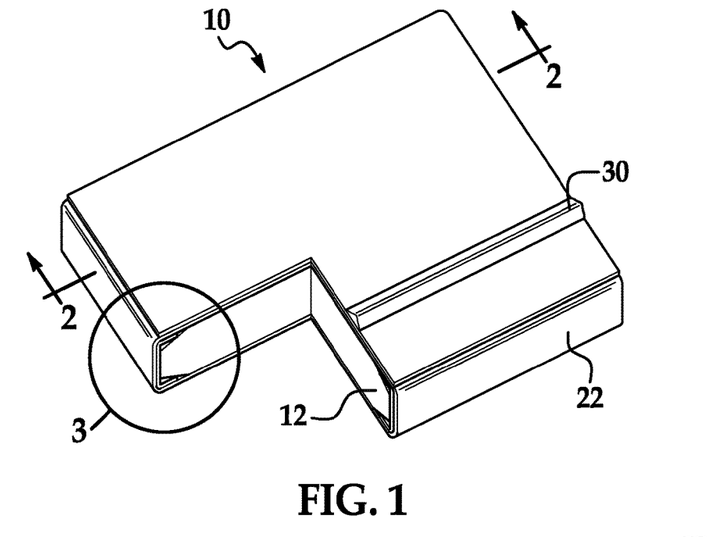
FIG. 1 is a perspective view of a panel according to an embodiment disclosed herein.

One non-limiting example of an embodiment of armor panel is depicted in FIG. 1. Armor panel 10 includes substrate panel member 12. The substrate panel 12 can be of any suitable size to be positioned in the interior of the desired vehicle. One non-limiting example of a suitable vehicle is a helicopter unit. Other non-limiting examples of suitable vehicles and armor applications in clued automotive vehicles, land and sea-based personnel carriers. The armor panel can be used in flooring orientations as well as other locations on the vehicle of choice. In certain embodiments, the substrate panel may encompass the entire floor or wall surface of the vehicle interior. However, in various embodiments, it is contemplated that the substrate material can be configured in individual panels that can be removably attached to the floor and/or wall in individual units to facilitate positioning and future repair or replacement.

Figure 2:
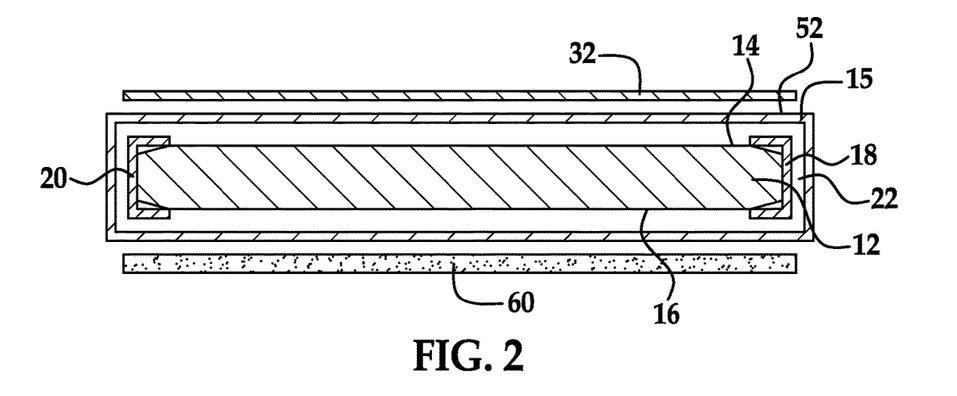
FIG. 2 is an expanded cross sectional view taken along the 2-2 line of FIG. 1.
Figure 3:
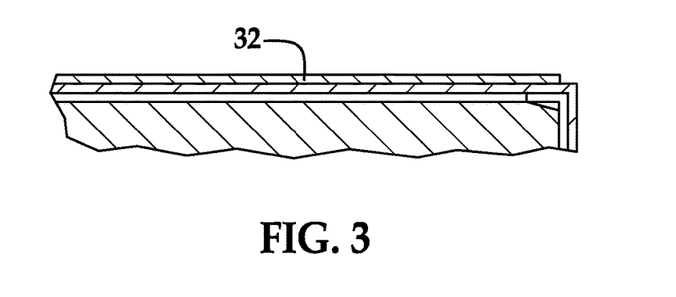
FIG. 3 is a detail view of FIG. 1.

The substrate panel 12, an upper face 14 and a lower face 16 as well as side edges such as side edges 18, 20. A polymeric coating composition layer 22 overlays at least one face of the substrate panel 12. In certain embodiments, the substrate panel 12 is encased with a polymeric coating composition layer 15. At least one non-limiting example of a suitable polymeric composition is one such as that described herein. Where desired or required, the polymeric composition layer 22 can be in direct contact with at least a portion of the substrate panels 12.

In various embodiments, the composition layer will encase the associated substrate panel 12 to form an armor panel 10 with a layer of suitable polymeric coating in overlying relationship there to. In such applications, the thickness of the polymeric layer can be between 0.01 and 0.25 inches thick with thicknesses between 0.04 to 0.10 being employed in some embodiments.

The panel configurations made up simply of a coating composition layer 14 attached to the substrate on at least one face can be employed in various locations to armor the associated vehicle. It is contemplated that the panels so configured can be advantageously positioned in areas that experience relatively lower wear and/or traffic patterns. Such panels can be employed in other locations as desired or required.

While the substrate materials described herein is discussed in conjunction with armor panels, it is to be understood that the polymeric material of the substrate and the associated coating may be employed in other end use applications as desired or required. It is also understood from the disclosure contained herein that the composition may be applied to various polymeric substrates surfaces having limited or challenging adhesion characteristics in order to reinforce the polymeric surface and limit undesirable wearing problems such as flaking chipping, gouging and the like. Non-limiting examples of challenging adhesion characteristics can be quantified as surfaces that are difficult to wet that have low surface energy with a Dyne level reading of less than 30.

It is contemplated that the coating composition as disclosed herein can be applied and connected to the substrate such that the coating composition overlies at least a portion of the polymeric substrate material. It is contemplated that the coating composition may directly contact the associated substrate surface in various embodiments. In alternate embodiments, it is contemplated that at least one intermediate layer can be interposed between the coating layer and the polymeric substrate surface. The interposed layer can function as a tie layer where desired or required.

The coating material can be applied as a layer overlaying at least a portion of the substrate surface. The coated portion may be applied to an individual face of the substrate or a portion of the individual face as desired or required. Typically the area coated will be one exposed to wear, abrasion or the like. In other embodiments, it is contemplated that the coating material will be applied in a manner that covers multiple faces of sides of the substrate or completely encases the associated polymeric substrate.

The coating material applied to the polymeric substrate can have a suitable thickness to protect the associated polymeric substrate material. In various embodiments, it is contemplated that the coating material can be applied in a manner that encases the substrate in a material of essentially uniform thickness. It is contemplated that coating thicknesses between 25 and 80 mils (0.64 to 2 mm) can be employed in certain embodiments. It is also contemplated that coating thicknesses between 40 and 50 mils (1.0 to 1.3 mm) can be employed in various embodiments.

Figure 4:
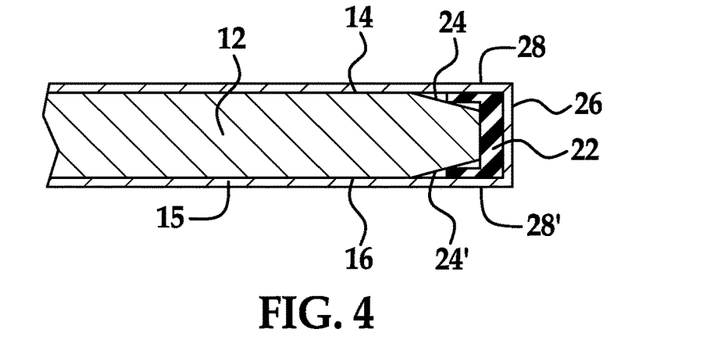
FIG. 4 is a partial cross section of an alternate embodiment of the armor panel device as disclosed herein.

The coating composition disclosed herein can reduce or eliminate degradation of the surface and/or the internal structure of the polymeric substrate material. It is contemplated that surface degradation and/or internal structural degradation of the polymeric substrate material may be due, at least in part, to the inherent physical characteristics of the substrate material including but not limited to characteristics such as friability of the substrate material as well as the external physical challenges associated with general use of the associated construct in day-to-day activities including, but not limited to, chipping, gauging and the like. It has been found, quite unexpectedly that the construct disclosed herein exhibits enhanced structural wear resistance and strength. It has been further ascertained that ballistic resistance and/or blast resistance characteristics of the associated polymeric substrate material are not unduly impaired by the addition of the coating material. Such resistance characteristics may be expressed and evidenced by phenomena including but not limited to heat dissipation and localized change of phase phenomena. In certain embodiments, it is contemplated that the coating composition may enhance the ballistic resistance and/or blast resistance of the resulting construct. Without being bound to any theory, it is believed that encasement in the coating composition disclosed herein provides surprising integration of the panel substrate that translates info integrated translation in response to deformation flex particularly in blast events.

Where it is anticipated that the armor panel(s) 10 may experience greater traffic or wear, the armor panels 10 can be configures with a suitable panel cap 22 overlying one or more side edges of the planar substrate 12, such as side edges 18, 20. As depicted in FIG. 4, the region of the upper and lower surfaces 14, 16 proximate to the associated side edge such as side edge 18 can be configured with a suitable geometry to conform and accept the channel cap element 22.

In the embodiment depicted in drawing FIGS. 1-4, the upper and lower surfaces are configured with complementary bevels or detents 24, 24'. One or more sides of the panel can be configured with a suitable panel cap 22. In the embodiment depicted in FIG. 1, the panel cap 22 can extend around all sides of the substrate panel member 12.

The panel cap 22 can be constructed of suitable polymeric or metallic material capable of capping and strengthening the associated side edge of the substrate panel member 12. In the embodiment depicted in FIG. 4, the substrate panel cap 22 has a central body 26 and two opposed wall members 28, 28' extending essentially perpendicularly from the central body 26 to define a central channel configured to receive the associated side of substrate panel member 12 in mating relationship therein. In various embodiments, the wall members 28, 28' extend sufficient distance from the body 26 to contain a substantial portion of the bevel region of the substrate panel member 12 therein. The wall members can have a thickness generally equal to the thickness reduction found in the bevel regions. The channel cap member can be maintained in position by any suitable means. The substrate panel cap 22 can be maintained by suitable position by mechanical fit or by use of a suitable adhesive interposed between the substrate panel member 12 and the interior channel defined in cap 22. One non limiting example of a suitable adhesive capable of affixing the panel cap in adhered relationship with the associated panel member 12. Suitable adhesive materials include, but are not limited to various curable polymeric materials such as suitable two part adhesive compounds. Non-limiting examples of such adhesives include materials such as those marketed under the trade name HYSOL commercially available form Henkel Corporation. Such materials are believed to be two-part epoxy-based adhesives. Suitable HYSOL materials include compositions marketed under the trade designation HYSOL EA9309.3NA. It is believed that HYSOL is a two part epoxy compositions that self cures and is composed of an "A" component containing epoxy resin and a "B" component containing a suitable diethylene glycol aminoalkylether.

Figure 6:
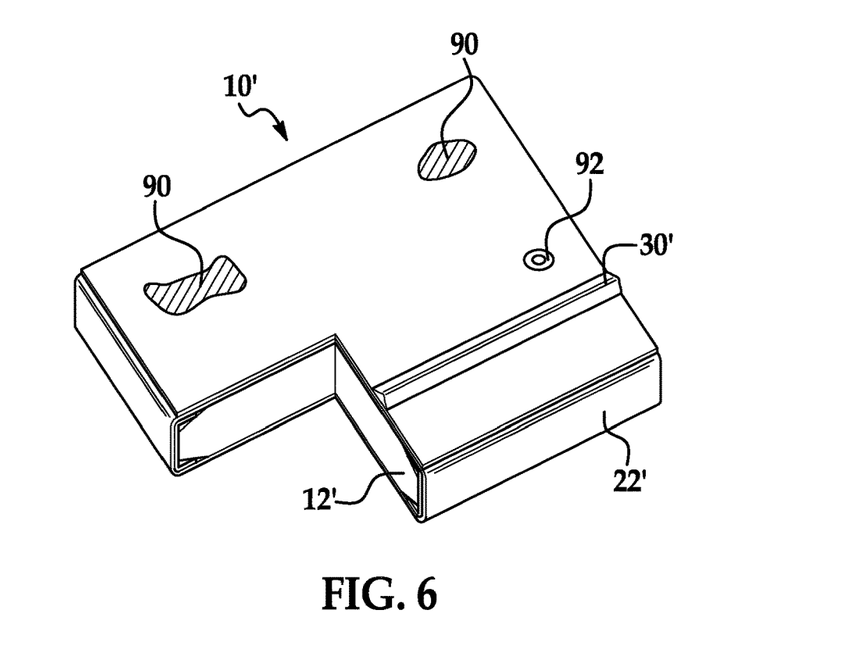
FIG. 6 is a detail view of a corner configuration for a panel cap member as disclosed herein.

The substrate panel cap 22 can have any suitable configuration. In the embodiment depicted in FIG. 4, the panel cap 22 has a U-channel configuration. The device 10 can be configured with the U-shaped channel in position in one or more of the side regions of the panel member 12. Thus in certain embodiments, the panel cap 22 can be positioned on one or more sides of the associated panel member 12. Alternately, the panel cap can surround the entire perimeter of the associated panel member 12.

Where the panel cap 22 surrounds or overlies corner regions of the panel member 12, the panel cap 22 can have rounded radius junctions between adjacent panel edges where desired or required.

Figure 5:
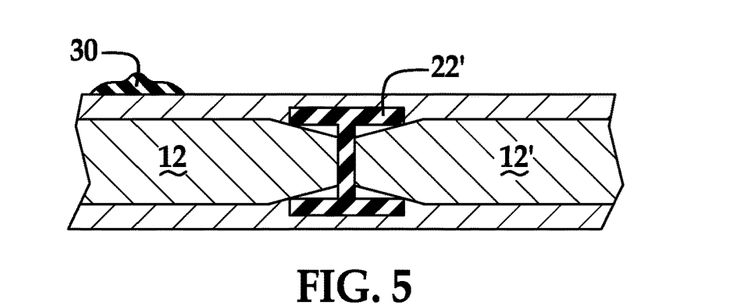
FIG. 5 is a partial cross section of an alternate embodiment of the panel cap member as disclosed herein with two substrate panel members in joined relationship thereto.

The panel cap 22 can also be variously configured with a suitable region to connect with adjacent substrate panel members 12 and 12'. One non limiting embodiment of a suitable configured U-channel 22' is depicted in FIG. 5 as a structure connection member configured to connect to first panel member 12 and second panel member 12'. The respective substrate panels 12, 12' can be held in place by mechanical fit and/or by suitable adhesives interposed between the respective panel substrate member and the panel cap. Where desired or required, the multi-panel construction can also be configured with a U-shaped panel cap 22 along one or more outside edges in the manner described previously.

The panel cap 22 can also be configured with suitable slots and braces to accept bolts, screws, and various clamps and structural members needed in construction in the associated vehicle. Such slots and braces (not shown) can be employed variously in order to anchor the armor panel 10 to structural members in the associated vehicle and/or to attach other devices or members to the armor panel 10.

As configured, the armor panel 10 with panel cap 22 in position is coated with the coating composition in the dimensions as outlined previously. Thus the coating composition layer 15 overlies the construct of panel cap 22 and substrate panel member 12 and can encase the panel cap 22 therein.

The reinforced armor panels can be installed in an edge-to-edge manner in the associated vehicle. In certain particular installations, unreinforced armor panels composed of the substrate panel 12 and coating layer 14 can be installed in low traffic areas for instance in helicopter cockpits and the like. Panels reinforced with suitable panel cap(s) 22 can be used in areas of the vehicle that experience higher levels of foot traffic such as vehicle doorways and the like. Panel cap(s) 22 configured to form a joint between two adjoining panel members can also be employed to form a larger surface area and reinforce the central rejoin defined therein.

Kick guard(s) 30 can be affixed to various substrate panel members 12 at locations that will correspond to vehicle step(s) and the like. In the embodiment depicted in FIG. 1, kick guard 30 can be attached to the panel 12 by any suitable mechanism. In various embodiments the kick guard(s) 30 can be riveted to the upper face of the armor panel 10 in overlying relationship to the coating composition layer 15. Attachment can be by any suitable mechanism for example by using suitable rivet fixtures positioned in panel member 10. The kick guard 30 can be formed from any suitable metal or polymeric material. In various embodiments, the hick guard can be affixed in overlying relationship to the coating composition layer 15.

The armor panel 10 can also be configured with suitable reinforced laminated layer(s) or skin 32. The skin 32 can be attached in overlying relationship to all or a portion of the outwardly oriented surface of the armor panel 10 when it is in the use position. The skin 32 can be composed of one or more layers of suitable woven or nonwoven polymeric material. The layer or layers that may contain reinforcing material such as carbon fiber or the like. In one embodiment, the skin 32 can be composed of at least one layer having a carbon fiber reinforcement material. One non-limiting example of suitable reinforced laminated layer material is polymeric film materials composed of carbon fiber entrained in a suitable polymeric resin matrix at levels between about 0.05% and about 10% carbon fiber to resin.

Reinforcement skin 32 can be adhered over the polymeric coating layer 14 using any suitable method that will provide good adhesion through the useful life of the pane 101. In the embodiment depicted, the reinforcement skin 32 skin is adhered to the polymeric coating layer 14 by a suitable adhesive layer interposed therebetween. Non limiting examples of such adhesive include suitable acrylate copolymeric adhesives such as acrylate copolymeric adhesives.

Where desired or required to promote adhesion, the armor panel 10 can include a suitable primer layer 52 interposed between the adhesive layer and polymeric coating layer. Suitable primer materials include but are not limited to primers such as surface primers commercially available from 3M under the trade designation Primer 94 used alone or with 3M 468 MP. 3M Primer 94 is believe to be an acrylate polymer in admixture with a chlorinated polyolefin and epoxy resin in a solvent matrix of materials such as cyclohexane, xylene, ethyl alcohol, ethylbenzene, and the like. Materials such as 3M 468 MP are formulated as an adhesive transfer tape that is believed to be an acrylate copolymer adhesive Such materials can be employed to promote adhesion between the coating layer 14 and various overlaying materials including the adhesive layer.

In situations where the armor panel 10 is to be positioned in locations in the vehicle that will experience heavy traffic and/or vehicle or heavy wheeled equipment loading, it is also contemplated that the armor panel 10 will include a foam spacer or base layer 60 that can be adhered to the polymeric coating layer 15 in any suitable manner. The foam spacer layer 60 will be positioned on the panel 10 so that it is oriented toward the vehicle exterior in a "downward" use orientation.

The foam base layer 60 can be a suitable open- or closed-celled polymeric material that exhibits deflection and deformability under load. The foam base layer functions as a spacer that cushions the panel member when in position in the vehicle. The foam base layer can be of any suitable thickness with thicknesses between 0.1 and 0.5 being employed in some embodiments. The foam base layer may extend over some or all of the lower face of the panel. In certain embodiments, the foam base layer can extend over the lower face of the panel to a point proximate to the associated U channel member.

In certain embodiments, the foam layer 60 can be adhered using a suitable spray adhesive applied either directly to the polymeric coating or to an intermediate primer layer such as primer layer 52. Suitable material will have high contact bond strength and rapid set up time. One non limiting example of a suitable adhesive is 3M HI-Strength 90 spray adhesive. Other materials are also contemplated as desired or required.

The coating composition employed in the coating composition layer 15 can be one that adheres to the surface of the substrate panel member 12. Suitable materials can be is formed from a plural component system that includes at least one first component and at least one second component that are reactively admixed prior to or upon contact with the substrate surface. The first component of the plural component system is an isocyanate component. The isocyanate employed herein will be an isocyanate material having high aromatic functionality. In various embodiments, it is contemplated that the isocyanate component will include an aromatic isocyanate prepolymer or quasi-prepolymer that is based upon a blend of a suitable aromatic diisocyanate and/or a prepolymer of a suitable diisocyanate and a suitable high molecular weight polyol.

Suitable aromatic diisocyanates employed in the prepolymer or quasi prepolymer include, but are not limited to, various alkyl and dialkyl diisocyanates, of which methylene diphenyl diisocyanate, toluene diphenyl diisocyanate, and hexamethylene diphenyl diisocyanate are non-limiting examples. Suitable high molecular weight polyols include but are not limited to various polyether polyols of which poly(tetramethylene ether) glycol polyols are but one non-limiting example. In various embodiments, it is contemplated that a suitable aromatic isocyanate quasi prepolymer, based upon a blend of an aromatic liquid MDI and a prepolymer of TDI and a p-TMEG polyol. One example of such material can be commercially obtained under the trade name INNOVATHANE® 101 from Air Products Corporation. It is contemplated that various embodiments can employ an aromatic quasi prepolymer of liquid MDI and a p-TMEG polyol where desired or required.

Additional non-limiting examples of aromatic polyisocyanate is methylene bis(4-phenylisocyanate) or "MDI." Pure MDI, quasi-prepolymers of MDI, and modified pure MDI, etc., are useful. Materials of this type may be used to prepare suitable elastomers. Since pure MDI is a solid and, thus, inconvenient to use, liquid products based on MDI are also disclosed as suitable for use in the present invention. For example, U.S. Pat. No. 3,394,164, which is incorporated herein by reference, describes a liquid MDI product. More generally, uretonimine modified pure MDI is also included. This product is made by heating pure distilled MDI in the presence of a catalyst. Examples of commercial materials of this type are ISONATE® 125M (pure MDI), ISONATE® 2143L (a liquid uretonimine-modified methylenediisocyanate product), RUBINATE® 1680 (a liquid uretonimine-modified methylenediisocyanate product), RUBINATE® 1209, RUBINATE® 9009 (an aromatic isocyanate quasi-prepolymer), RUBINATE® 9015 (an aromatic isocyanate quasi-prepolymer), and RUBINATE® M ("liquid" MDI's). The ISONATE® products are available from Dow Chemical Co. in Midland, Mich., and the RUBINATE® products are available from ICI Polyurethanes located in West Deptford, N.J.

It is contemplated that the quasi prepolymer of the isocyanate component of the plural component system can be reacted with a sufficient quantity of a suitable high or increased functionality diisocyanate to form the reactive isocyanate component of the plural component system. Suitable high or increased functionality diisocyanates include, but are not limited to, diisocyanates with functionality of 2.0 or greater. Non-limiting examples of suitable high functionality isocyanates include materials having a percent NCO between about 25 and 35. High functionality isocyanates can be based upon polymeric methylene diisocyanates modified to provide functionalities of 2.90 to 3.0 and percent NCO between 20 and 35%, with percentages between 22% and 32% being employed in certain situations. Non-limiting examples of such materials include RUBINATE 9257 and SUPRASEC 9582 commercially available from Huntsman Polyurethanes. It is believed that RUBINATE 9257 is a polymeric methylene diphenyl diisocyanate modified to provide a functionality of 2.9 and a percent NCO of 30.1.

Where desired or required, the isocyanate portion can also optionally include suitable additives such as fire retardants and the like. Non-limiting examples of suitable fire retardant compounds that can be incorporated into the isocyanate portion of the plural component composition disclosed herein. Non-limiting examples of such fire retardants include Tris-(Chloropropyl)phosphates and the like. Suitable materials are available from under the trade name Antiblaze 80/Fyrol PCF. Where a flame retardant is incorporated, it is contemplated that the compound or compounds can be present in an amount sufficient to impart flame retardance or resistance to the resulting composition with amounts between 0 and 10 pbw of the isocyanate composition being contemplated in various instance.

It has been found unexpectedly that materials such as Tris-(Chloropropyl) phosphates and the like may help to lower the viscosity and enhance processability and application characteristics of the resulting coating system.

It is contemplated that the isocyanate portion can be composed of one or more isocyanate compounds. The isocyanate compounds can be present in the isocyanate portion in amounts between 95 and 100 pbw of the isocyanate portion of the composition. Where blend of isocyanate materials are employed, it is contemplated that the isocyanate component can be a blend of between about 70 and 100 pbw quasi isocyanate prepolymer and between 0 and 30 high functionality diisocyanate material, with 70 and 95 pbw quasi isocyanate prepolymer and between 10 and 25 pbw high functionality diisocyanate material in various embodiments of the composition.

The isocyanate portion of the composition disclosed herein can be formulated to provide a suitable available NCO content upon blending with available NCO contents between about 15 and about 18% upon blending being desirable in at least some embodiments.

The coating material as disclosed herein is a two-component system prepared from the reactive admixture of the suitable isocyanate component such as s those previously enumerated with a suitable resin or polymeric component in sufficient quantity and reactive ratio to produce tensile strength, hardness and flexibility properties that are required for this given application. Reactive ratios can be between 1.00:1.00 and 1.50:1.00, isocyanate to resin.

The polymeric component of the reactive admixture is one that can be employed to represent the backbone of the composition. It is to be understood that any suitable polymers may be used. Non-limiting examples of suitable polymers include, but are not to be limited to, amine-terminated polyetherpolyols, amine-based tetrol polyols, high functional polyols, amine-terminated chain extenders, and the like.

Suitable amine-terminated polyether polyols suitable for use in the composition disclosed herein include amine-terminated polypropylene glycol having a molecular weight between 400 and 4000. Typical average molecular weights for suitable materials in certain applications would be in the range of 2000. Non-limiting examples of suitable materials having amine-terminated polyether polyol functionalities include JEFFAMINE D-2000 from Huntsman Polyurethanes and Polyether Amine D-2000 from BASF Corporation. It is believed that materials such as JEFFAMINE D-2000 and Polyether Amine D-2000 are difunctional primary amine polyetheramines with an average molecular weight of approximately 2000. Where desired or required, various other difunctional amines within this class can be employed in combination with the difunctional primary amine polyetheramines or in place of these materials. It is contemplated that the amount of difunctional amine employed can be between 10 and 80 pbw, with amounts between 20 and 40 pbw being utilized in specific applications in the initial formulation. In specific automotive applications, it is contemplated that the amount of difunctional amine employed can be between 10 and 20 with amounts between 15 and 18 pbw of the resin blend being utilized in specific applications.

Amine-based tetrol polyols are those characterized as tetrafunctional polyols initiated from ethylene diamine. Non-limiting examples of suitable materials will typically have a hydroxyl number in the range of 700 to 800. Suitable materials can be derived from ethylene diamine and propylene oxide or ethylene diamine and mixtures of ethylene oxide and propylene oxide. Amine-based tetrol polyols can include various polyether polyol aliphatic amine initiated tetrols present in amounts between 15 pbw and 40 pbw. In specific formulations in certain embodiments, it is contemplated that the amine-based tetrol polyols can be present in amounts between 8 pbw and 25 pbw. Non-limiting examples of such materials include VORANOL 240-700 or VORANOL 800, which are believed to be ethylene diamine and ethylene oxide/propylene oxide adduct polyols commercially available from Dow Chemical. Other useful materials include ethylene diamine propylene oxide adduct polyols available from BASF Corporation under the trade name QUADROL.

High functional polyols can also be effectively employed. These materials are typically characterized as tetra or pentafunctional polyols of propylene oxide initiated from pentaerythratol or sucrose. Suitable high functional polyols can have a molecular weight in the range of 400 to 600. Without being bound to any theory, it is believed that these polyols provide for cross-linking of the polymer and resulting stiffness and hardness without embrittlement. Non-limiting examples of such materials include secondary polyether tetrols having a hydroxyl number between about 200 and about 800. Such materials include PLURACOL PEP 550, commercially available from BASF Corporation. In certain specific embodiments, it is contemplated that the secondary polyether tetrol will have a hydroxyl number between about 450 and about 550.

The resin component of the composition of the composition disclosed herein may further optionally include a chain extender and/or a blend of chain extenders present in an amount sufficient to impart a predetermined amount of tensile strength, weatherability, flexibility, adhesion to specific substrates, and hardness to the overall system. Where employed, the chain extender component can be present in an amount between 1 and 25 pbw, with amounts between 10 and 20 pbw being present in certain applications. It is believed that the chain extender(s) may also adjust the reaction rates of the overall system. Amine-terminated chain extenders can be characterized as diamines that are either primary or secondary in nature. These can either be aromatic or aliphatic based resins.

Suitable chain extenders are selected from the group consisting of dialkyl substituted methylene dianiline, diethyltoluene diamine, substituted toluene diamines, and mixtures thereof. Other suitable chain extenders may include amine terminated aliphatic chain extenders selected from (but not limited to) the group consisting of cyclohexane diamine, isophorone diamine, and mixtures thereof. Other suitable chain extenders may include low molecular weight glycol type chain extenders, such as, for example, 1,4-butane diol. Non-limiting examples of primary aromatic amines are ETHACURE 100 (DETDA: Diethyl toluene diamine), and ETHACURE 300 (DMTDA:Dimethyl thiotoluene diamine) from Albemarle Corporation.

It is contemplated that the resin component may contain various dual function compounds. One non limiting example of a suitable dual function compound is melamine. Without being bound to any theory it is believed that melamine functions as a chain extender and also possesses fire retardant capability. Where employed in the resin component, it is contemplated that melamine will be present in an amount between 2 and 5 pbw. One non limiting example of suitable melamine material is commercially available from DSM Melamine Americas, Inc.

The resin component may include suitable fillers and additives as desired or required. In certain embodiments, it is contemplated that the resin component may include various materials added as pH modifiers and/or to alter and affect heat resistance of the finished composition. Non limiting examples of such materials include various multivalent metal borates.

Suitable multivalent metal borates are those of divalent metals, particularly metals of Group II of the Periodic Table, and especially the borates of zinc and calcium. Borates having low oil absorbency can be employed effectively with good results obtained with zinc borate. The amount of multivalent metal borate added to the composition is usually at least 5% by weight, based on the weight of the polymeric substrate.

Non-limiting examples of suitable fire retardant materials include compounds such as magnesium hydroxide, calcium hydroxide, barium hydroxide, sodium tetra borate decahydrate, or pentahydrate, sodium metal borate tetrahydrate, sodium tetraborate, sodium carbonate, hydrates of sodium carbonate, sodium citrate and hydrates thereof, and similar compounds of potassium, lithium and ammonium, pyridine, pyrrole, 2-aminoethylpropanol, benzylamine, n-butylamine, t-butylamine, ethylamine, ethylenediamine, hexamethylene diamine, methylamine, 3-aminopentane, 3-amino-3-methyl pentone, piperazine, 1,3-diamino-propane and propylamine and the like.

The resin component may also contain suitable additional fire retardant materials including but not limited to silica or silica flour, barytes, talc, aluminum trihydrate, calcium carbonate, ammonium phosphate and the like. The additional fire retardant component can be present in the resin component in any suitable amount with quantities between about 0 and 7 pbw based on the resin component being contemplated. In various specific embodiments, it is contemplated that the additional fire retardant material will be aluminum trihydrate.

It is contemplated that one or more of the fire retardant materials can be present in the resin component at particle sizes at or below nano particulate levels. The resin component may also contain suitable additional fire retardant material including but not limited to expandable graphite. It is believed that various expandable graphites are nano particulate graphite. Expandable graphite would include but is not limited to commercial material such as Nyacol Nyagraph from Nyacol Nano Technologies, Incorporated.

The resin component can also include classes of fire retardants typically referred to as brominated fire retardant materials. In addition to fire retardancy, these also offer smoke suppression characteristics. Suitable materials may include various brominated aromatic compounds. Where employed, these brominated materials will be present in amounts between 10-15 pbw. Examples of these include but are not limited to SAYTEK 102E from Albemarle Corporation.

The resin component of the composition disclosed herein may further optionally consist essentially of any suitable colorants, pigments, or the like, as desired. Some non-limitative examples of such materials are selected from the group consisting of carbon black, titanium dioxide, iron oxide (a suitable iron oxide is commercially available under the trade name RED OXIDE from Harcros Chemicals, Inc., Kansas City, Kans.), organic pigments and dyes, and mixtures thereof. These compounds are used primarily to impart a specific color to the composition. However, in some instances, carbon black and titanium dioxide, for example, may also affect the hardness of the system. Where employed, pigment materials can be present in amounts suitable to impart the desired coloration in the finished composition as applied. In various embodiments contemplated herein, pigment material is present in the resin component in amounts between 0 and 12 pbw of the initial resin component, with amounts between 7 and 10 pbw being contemplated in some embodiments.

It is also contemplated that the resin component include suitable adhesion promoters as desired or required. Non-limiting examples of adhesion promoters include chlorinated polyolefins and polyester based resins. Non-limiting examples of chlorinated polyolefins include materials commercially available from Eastman Chemical under the trade name of Eastman CP series. Non-limiting examples of polyester based resins include materials commercially available from King Industries under the trade name of K-Flex. Suitable materials can include K-Flex 188. Where employed, it is contemplated that the adhesion promoter can be present in amounts between about 0.15 and 5 pbw resin component with amounts between 0.5 and 2 pbw being contemplated in certain embodiments.

It is also contemplated that the resin component can be formulated with suitable fungicides, algaecides and the like. Suitable materials include various thiophenols of which zinc pyrithione is one non limiting example. Zinc pyrithione is commercially available from Arch Biocides under the trade name Zinc Omadine. Where employed it is contemplated that the fungicide material will be present in an amount between 0.001 and 0.01 pbw.

The isocyanate and resin component can be formulated to provide an index of 1.05 to 1.20 with indexes of 1.10 to 1.15 being applicable in certain applications. It is contemplated that these components can be mixed either using high pressure impingement mixed spray equipment or low pressure static-mixed extrusion techniques.

It is also contemplated that the coating composition disclosed herein is a two-component system prepared from the reactive admixture of a suitable isocyanate component with a resin or polymeric component in sufficient quantity and reactive ratio to produce tensile strength, hardness, adhesion and flexibility properties that are required for the given application. Reactive ratios can be between 1.00:1.00 and 1.50:1.00.

The coating composition can be applied to the desired substrate in any suitable manner, including, but not limited to, multi-component application techniques. It is contemplated that the coating composition can be applied in overlying relationship with the substrate using suitable spray and/or hot melt application techniques, including, but not limited to extrusion. The material can be applied to at least one surface region by any suitable application technique. It is contemplated that the material will be applied in a liquid or semiliquid state and will solidify completely after application. Solidification may be due in whole or in part to temperature decrease or may be due to cross-linkage formation depending upon the type and nature of the polymeric composition.

The resulting device or construct comprises a substrate element with a multi-component polymeric composition affixed in layered relationship to at least one surface region. In certain embodiments, the resulting construct will be composed of a molded substrate composed of a friable polymeric material with a coating composition overlaying at least a portion of the substrate surface. The substrate can be configured as a panel or other suitable geometric configuration. The coating material will have a suitable thickness with coating thicknesses sufficient to protect the underlying substrate from gauging, degradation and the like with thicknesses between 25 and 80 mils (0.64 and 2 mm) being contemplated in certain embodiments.

In various other embodiments, it is contemplated that the substrate can be encased in coating material applied at a thickness sufficient to protect the underlying substrate from gauging, degradation and the like. It is contemplated that the coating thickness will be that sufficient to protect the underlying substrate based upon the end use application. In certain embodiments, it is contemplated that thicknesses between about 25 and 80 mils (0.64 and 2 mm) can be employed.

In certain embodiments, it is contemplated that the substrate material will be composed of UHMWPE materials such as DYNEEMA formed into panel structures of sufficient thickness to impede transit of ballistic materials such as bullets and shrapnel and the like. It is contemplated that the resulting panels can be positioned as floor panels in various vehicles such as helicopters and the like. Without being bound to any theory, it is believed that that the construct disclosed herein in which the a suitable antiballistic material such as DYNEEMA is coated with the coating material outlined herein provides a durable construction in which the coating is integrally connected to the substrate surface in overlying relationship thereto.

The resulting coating material is a plural component system that can be applied to the substrate in any suitable manner. Broadly construed, it is contemplated that the application method can comprise the steps of admixing an isocyanate component as disclosed herein with a resin component as disclosed herein to form a plural component system; dispatching the plural component system at elevated temperature and high pressure; and applying the plural component system onto at least a portion of difficult to coat substrate and/or other surface.

The plural component system is preferably applied at high pressure and elevated temperature using suitable spray equipment. In many applications, it is contemplated that the spray applicator will be a two-component system. In general, it is contemplated that elevated dynamic pressure in a range between 1500 psi and 2500 psi can be successfully utilized. It is also contemplated that the applicator will be one that utilizes elevated temperature in at least a portion of the mixing and/or application process. It is contemplated that material can be mixed and applied at an elevated temperature in a range between 110 degrees F. and 170 degrees F. The material is uniquely formulated for robotic application and impingement mix dispensing where mix ratio tolerance is required.

The resulting plural component material can be applied to the associated structure in a manner that provides a final layer thickness between 20 mils and 80 mils. It is contemplated that the material layer thickness can be essentially consistent throughout the layer. However where desired or required, the layer thickness can be varied over the coverage area, for example, in order to accommodate excessive wear areas and/or irregularities in the underlying surface area. It is also contemplated that the thickness of the applied material can be varied based on the specific region of the substrate to be coated. As a non-limiting example, it is contemplated that the thickness of the coating to be applied can be increased or deceased over corners, edge regions and the like as desired or required.

The coating system disclosed herein can be applied by any suitable method. The method chosen will typically provide for reactive admixture of the various components at a point in the application process suitable for promoting liquid or semi-liquid administration of the polymeric material to the surface of the substrate with additional solidification of the applied material occurring after contact with the substrate. It is contemplated that solidification can include physical solidification as the temperature of the applied material drops after application. However, in many instances, it is contemplated that the chemical cross linking will commence with the contact between the various components with the cross linking reaction(s) proceeding to a point prior to application that will still facilitate application and adhesion to the substrate surface with the cross-linking reaction continuing post application.

The dual component material can be processed in any manner suitable to provide and promote the reactive admixture and application of the resulting material. Thus, where desired or required, the materials can be processed at elevated pressure and/or temperature. As used herein, the terms "elevated temperature" and "elevated pressure" are defined as values above standard temperature and pressure (STP). In certain situations, it is contemplated that one or both values will be above ambient. The temperature and/or pressure elevation can be that necessary to achieve reactive admixture and maintain the material in a suitable state for application. It is contemplated that elevated temperature will be at least 25° C. above standard temperature with an upper temperature elevation being limited to the decomposition temperature of one or more of the component materials. In certain applications, temperature elevation will be at least 35° C. above standard. It is also contemplated that one or more of the component process streams can be preheated prior to reactive admixture. The preheat temperature for a given component can be affected for a variety of factors including, but not limited to, altering physical characteristics of the component stream, non-limiting examples of which include viscosity. It is also contemplated that the temperature of a given component stream can be elevated to enhance or promote the reaction upon admixture with one or more additional components or component streams. Introduction temperatures for one or more of the component streams can be at least 25° C. above standard, with temperature elevations of at least 35° C. being contemplated in certain embodiments.

It is contemplated that in such dual component systems, the (A) component and the (B) component of the coating system are combined or mixed under high pressure; most preferably, they are impingement mixed directly in the high-pressure spray equipment. Non-limiting examples of suitable spray mixing equipment include various units available under the following trade names: GUSMER H-2000, GUSMER H-3500, GUSMER H-20/35, and GlasCraft type proportioning units. It is contemplated that such units can be fitted with suitable applicators such as various mix spray guns of which units variously available under the following trade names are non-limiting examples: GUSMER GX-7, GUSMER GX-7 400 series, GUSMER GX-125 or GUSMER GX-8, and GlasCraft Probler P2 impingement mix spray guns. Where such devices are employed, it is contemplated that the two respective components can be mixed under high pressure inside the spray gun for the coating/lining material system. The mixed material is then applied to the desired substrate via the spray gun.

It is contemplated that the applied material can be compounded in a suitable manner to achieve an essentially instantaneous set. It is also considered to be within the purview of this disclosure that the applied material may compounded in such a way as to facilitate or permit post-curing operations to be performed on the dispensed material. It is contemplated that any specific post-curing processes involving materials such as disclosed material will be optional in many or most situations.

The method also contemplates various pre-cure and/or pre-application and post cure steps and processes. Non-limiting examples of suitable pre-cure and/or pre-application steps include various surface preparation operations. It is contemplated that the plural component aliphatic sprayable polymeric system can be applied to any suitably prepared surface. Non-limiting examples of the pre-application processes or steps include various cleaning operations. It is contemplated that the material can be successfully applied to surfaces that are reasonably free of surface dirt and contamination. The surface to which the material is applied can be difficult-to-coat surfaces of which DYNEEMA is but one example.

Additional examples of precure/preapplication steps include various surface preparation steps include, but are not limited to, priming and various surface treatments such as corona discharge treatment.

It is contemplated that the applied plural component polymeric system achieves an initial cure essentially instantaneous with application. By "essentially instantaneous cure" as used herein, it is contemplated that the applied plural component aliphatic sprayable polymeric urea system is stable without appreciable running or puddling upon application with a dry and tack free surface as defined in test method ASTM D 1640 (Standard Test Methods for Drying, Curing, or Film Formation of Organic Coatings at Room Temperature) achieved within three minutes of application.

The plural component polymeric system material as disclosed herein may be applied on any suitable substrate surface. In most situations, it is contemplated that the system material can be successfully applied to substrate surfaces that are clean and free of dirt, oils, and other debris. It is contemplated that the target substrate can be cleaned and prepared by any suitable industrial cleaning method.

The polymeric coating material can be applied directly to the outer surface of the substrate. It is also contemplated that the substrate can be treated with various substrate treatment processes including, but not limited to, various passivation techniques, sealants, primers and the like. It is contemplated that the polymeric coating material disclosed herein can be applied directly to the substrate surface and achieve the desired level of adhesion. However, where desired or required, it is considered to be within the purview of this disclosure to interpose at least one adhesion promoting material between the substrate and the applied material.

Spray application can occur in a single pass or multi pass system with the dispensed material applied to an ultimate or final thickness between 25 mils and 80 mils in certain applications. The applied material will be dry and tack free within 3 minutes of application, with tack free status occurring in many formulations in less and 60 seconds. Once the material is tack free, the coated substrate such as a helicopter floor panel is considered suitable for continued assembly.

It has been found quite unexpectedly that polymeric material disclosed herein exhibits good adhesion to various difficult to coat materials such as UHMWPE and the like remains stable upon prolonged high traffic usage. It is also based upon the discovery that the applied coating composition will not compromise that ballistic impedance of the associated substrate when the construct is used as vehicle armor.

To further illustrate the present invention, the following examples are given. It is to be understood that these examples are provided for illustrative purposes and are not to be construed as limiting the scope of the present invention.

Example I

A polymeric composition was prepared according to the present disclosure in the following manner. The following compounds in the stated weight percentages were admixed to form the resin component:

| TRADENAME | QUANTITY | PERCENT SOLIDS |
|---|---|---|
| Polyetheramine D-2000 | 47.0 pbw | 100 |
| ETHACURE 100 | 19.0 pbw | 100 |
| Melamine | 3.0 pbw | 100 |
| Aluminum Trihydrate | 5.0 pbw | 100 |
| Zinc borate | 5.0 pbw | 100 |
| Bromine material (60% bromine) | 10.0 pbw | 100 |
| K-Flex 188 (for adhesion) | 1.0 pbw | 100 |
| Pigment | 10.0 pbw | 100 |

The resultant composition is a liquid material under ambient conditions and has a viscosity suitable for spray application processes The second component of the composition of the present invention comprises a liquid isocyanate composition comprised of 95 pbw INNOVATHANE and 5 pbw ANTIBLAZE 80/FRYOL PCF. The resulting material has a viscosity under ambient conditions suitable for spray application processes. The estimated NCO is 15%.

Example II

A polymeric composition was prepared according to the present disclosure in the following manner. The following compounds in the stated weight percentages were admixed to form the resin component:

| TRADENAME | QUANTITY | PERCENT SOLIDS |
|---|---|---|
| Polyetheramine D-2000 | 41.5 pbw | 100 |
| PLURACOL PEP 550 | 10.0 pbw | 100 |
| ETHACURE 100 | 15.5 pbw | 100 |
| Melamine | 4.0 pbw | 100 |
| Aluminum Trihydrate | 5.0 pbw | 100 |
| Zinc borate | 5.0 pbw | 100 |
| SAYTEK 102E | 10.0 pbw | 100 |
| K-Flex 188 (for adhesion) | 1.0 pbw | 100 |
| Pigment | 8.0 pbw | 100 |

The resultant composition is a liquid material under ambient conditions and has a viscosity suitable for spray application processes.

The second component of the composition of the present invention comprises a liquid isocyanate composition comprised of 70 pbw INNOVATHANE, 25 pbw RUBINATE 9257 and 5 pbw ANTIBLAZE 80/FRYOL PCF. The resulting material has a viscosity under ambient conditions suitable for spray application processes. The estimated NCO is 19%.

Example III

A polymeric composition was prepared according to the present disclosure in the following manner. The following compounds in the stated weight percentages were admixed to form the resin component:

| TRADENAME | QUANTITY | PERCENT SOLIDS |
|---|---|---|
| Polyetheramine D-2000 | 45.0 pbw | 100 |
| PLURACOL PEP 550 | 7.5 pbw | 100 |
| ETHACURE 100 | 17.5 pbw | 100 |
| Melamine | 3.0 pbw | 100 |
| Aluminum Trihydrate | 2.0 pbw | 100 |
| Zinc borate | 6.0 pbw | 100 |
| SAYTEK 102E | 10.0 pbw | 100 |
| K-Flex 188 (for adhesion) | 1.0 pbw | 100 |
| Pigment | 8.0 pbw | 100 |

The resultant composition is a liquid material under ambient conditions and has a viscosity suitable for spray application processes.

The second component of the composition of the present invention comprises a liquid isocyanate composition comprised of 85 pbw INNOVATHANE, 10 pbw RUBINATE 9257 and 5 pbw ANTIBLAZE 80/FRYOL PCF. The resulting material has a viscosity under ambient conditions suitable for spray application processes. The estimated NCO is 16.7%.

Example IV

A polymeric composition was prepared according to the present disclosure in the following manner. The following compounds in the stated weight percentages were admixed to form the resin component:

| TRADENAME | QUANTITY | PERCENT SOLIDS |
|---|---|---|
| Polyetheramine D-2000 | 38.0 pbw | 100 |
| PLURACOL PEP 550 | 7.0 pbw | 100 |
| ETHACURE 100 | 16.0 pbw | 100 |
| Melamine | 3.0 pbw | 100 |
| EXOLITE AP 423 | 15.0 pbw | 100 |
| Magnesium hydroxide | 7.0 pbw | 100 |
| SAYTEK 102E | 3.0 pbw | 100 |
| K-Flex 188 (for adhesion) | 1.0 pbw | 100 |
| Pigment | 8.0 pbw | 100 |

The resultant composition is a liquid material under ambient conditions and has a viscosity suitable for spray application processes.

The second component of the composition of the present invention comprises a liquid isocyanate composition comprised of 85 pbw INNOVATHANE, 10 pbw RUBINATE 9257 and 5 pbw ANTIBLAZE 80/FRYOL PCF. The resulting material has a viscosity under ambient conditions suitable for spray application processes. The estimated NCO is 16.7%.

Example V

In order to apply the various compositions, the components outlined in Examples I through IV were processed using a GUSMER H-3500 plural component proportioning pump capable of capable of high temperature and high pressure at a 1:1 by volume ratio. The proportioning unit was fitted with a GlasCraft P2 air purge spray gun fitted with an 01 chamber/tip combination. The systems were processed at a spray pressure of 2200 psi fluid pressure and processing temperature of 150-160° F.

Samples of Example I through IV were applied to a plastic film sheet for preparation of free film samples for testing. The following results were noted and are summarized in the following table.

| ELASTOMERIC PROPERTIES | | | | |
|---|---|---|---|---|
| TEST METHOD | EXAMPLE I | EXAMPLE II | EXAMPLE III | EXAMPLE IV |
| GEL TIME, secTack free, sec | 3-5 10 | 2-4 10 | 3-5 10 | 3-5 10 |
| Shore D Hardness ASTM D 2240 | 50 | 62 | 55 | 96 |
| Tensile strength, psi ASTM D 638, D412 | 4650 | 2610 | 3670 | 2625 |
| Elongation, % | 450 | 100 | 285 | 131 |
| Tear strength, pli ASTM D624 | 520 | 350 | 385 | 485 |

Examples VI-X

Compositions are prepared according to the procedures and formulations previously outlined. The respective four polymeric material formulations are applied in the manner previously designated to substrates of DYNEEMA substrate configured for use as antiballistic armor for high traffic floor areas on helicopter floors. The respective formulations are applied at a thickness of 100 microns and subjected to various activities including general wear and defensive actions and thus include scuffing, impact tests, chipping, scarring and the like. The applied materials exhibit surprising resistance to some or all of chipping, denting, gouging abrasion and the like.

Examples X-XIV

Samples of the DYNEEMA armor material with one of the respective formulations applied at a thickness of 100 microns are tested to determine the antiballistic characteristics of the associated construct. The constructs are tested for resistance to standard ballistic materials according to conventional military specifications. Little or no degradation in antiballistic characteristics is noted.

Examples XV-XIX

Compositions are prepared according to the procedures and formulations previously outlined with respect to Examples I-V. The respective four polymeric material formulations are applied in the manner previously designated to substrates of DYNEEMA UD HB substrate material configured for use as antiballistic armor for high traffic floor areas on helicopter floors. The respective formulations are applied at a thickness of 100 microns and subjected to various activities including general wear and defensive actions and thus include scuffing, impact tests, chipping, scarring, and the like. The applied materials exhibit surprising resistance to some or all of chipping, denting, gouging abrasion and the like. Samples of other substrates such as SPECTRA and TWARON are also tested and exhibit chip, dent, and gauge resistance.

Examples XX-XXIV

Samples of the DYNEEMA UD HB armor material with each of the respective formulations are applied at a thickness of 100 microns are tested to determine the antiballistic characteristics of the associated construct. The constructs are tested for resistance to standard ballistic materials according to conventional military specifications. Little or no degradation in antiballistic characteristics is noted. Similar tests are run with SPECTRA and TWARON with similar results.

Example XXV

The formulations outlined in Examples I through IV are modified in order to integrate fungicide material Zinc pyrithane specifically material commercially available under the trade name ZINK OMADINE from Arch Biocides in amounts varying from 0.001 to 0.01 pbw. The material is integrated in the resin or first component prior to integration with isocyanate component. The final formulations are prepared and applied as outlined in Example V and exhibit performance characteristics of the nature outlined in that Example.

Example XXVI-XXXI

Samples prepared according to the process outlined in Examples I through V as well as XXV are evaluated to various environmental challenges as outlined in MIL-STD-810F.

1. High Temperature Storage (Cyclic) Test Per Mil-STD-810F Method 501.4 Procedure I Table 501.4-11.

Samples of 4"×4" are exposed to seven 24 hour temperature/cycles variable between 38° C. and 80° C. The samples are visually inspected at the end of the seventh cycle after being brought back to ambient. No visible damage is noted.

2. Low Temperature Storage Per Mil-STD-801 F Method 502.4, Procedure I.

Samples are stabilized at −60° C. for a 72 hour period and then returned to ambient. No visible damage to the samples is noted upton visual inspection. Sample size is 4"×4".

3. Hot/Cold Storage (Oversized Samples) Per Mil-STD-801 F Method 502.4, 501.4.

Samples with dimensions 47"×6"×1" are exposed seven 24 hour cycles with temperature extremes of +30° C. and +70° C. and repeated with a temperature extreme of −50° C. Samples are visually inspected after return to ambient and exhibit no visible damage.

4. Humidity Test Per Mil-STD-810 F Method 507.4 Paragraph 4.5.2.

Samples with dimensions of 4"×4" are preconditioned +23° C./50% RH for 24 hours and exposed to five 48 hour temperature humidity cycles varying between 50% RH and 95% RH with temperatures cyclically varying between 30° C. and 70° C. Samples are returned to ambient and evidence no damage upon visual inspection.

5. Transit Drop Per Mil-STD-801 F Method 507.4 Paragraph 4.5.2.

Samples are 10"×10"×1" and are exposed to 26 drops from 48" on all corners, edges and faces. Visual inspection indicates durable material. Minor corner splitting in certain samples is within tolerances.

6. Contamination by Fluids (Immersion) Mil-STD-801 F Method 504

Thirty six samples measuring 4"×4" are prepared for each formulation according to the methods outlined in Examples I-V and XXV. Samples were immersed in various test fluids including jet fuel, salt water, hydraulic fluid and lubricating oil with fuels and salt water maintained at ambient while hydraulic fluid and oil are held at 70 degrees C. with a daily cycle of 8 hrs wetted and 16 hours draining for 30 days. Samples are visually inspected and evidenced no damage. One sample is removed and inspected every 5 days. Sample evidence no minimal degradation upon visual inspection.

7 Adhesion Test Per Mil-PRF-85285 Paragraph 4.5.5

Samples are exposed to a 24 hour soak in deionized water and removed from the immersion. Sample sizes are 10"×10 and 12"×4" Within 3 minutes of removal two parallel scribes are made of 2" that are ¾" apart. The material is then scribed from opposite ends to form an X pattern. A 1 inch wide strip of tape is placed across the scribes. A roller as specified in FED STD141 is passed 8 times over the tape. The tape is removed in one quick motion and visually examined. Minor flaking may be noted in some samples at the scribe line but is within tolerances.

8. Adhesion Test Per Mil-PRF-23377 Paragraph 4.5.4

Samples are exposed to a 24 hour soak in deionized water and removed from the immersion. Sample sizes are 10"×10 and 12"×4" Within 3 minutes of removal two parallel scribes are made of 2" that are ¾" apart. The material is then scribed from opposite ends to form an X pattern. A 1 inch wide strip of tape is placed across the scribes. A roller as specified in FED STD141 is passed 8 times over the tape. The tape is removed in one quick motion and visually examined. Minor flaking may be noted in some samples at the scribe line but is within tolerances.

9. Adhesion Test Per Mil-PRF-46103E Paragraph 4.4.9

Samples measuring 12"×4" and 10"×10" are prepared. Four inch long parallel cuts are made on the sample followed by a 1" cut at a right angle so that a tab can be peeled from the sample. A two pound weight is attached to the tab so that the resultant peel force is normal to the plane of the sample. Gage marks are made on the sample for measurement for measurement of peeling. The weight is permitted to stand for four hours at ambient temperatures. No additional peeling is evidenced in the samples.

Figure 7A:
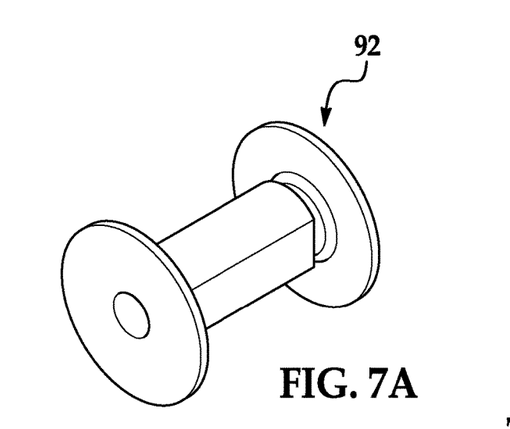
FIG. 7A is an alternate embodiment of a panel with apertures present therein.

The pale member 10 can be configured with suitable through bores and apertures as desired or required to accommodate various vehicular fittings, structural ambers and the like. As depicted in FIG. 7A, the panel 10 has suitable apertures 90. These apertures may be produced by suitable processes including but not limited to cutting milling or the like. Where desired or required the interior surface of the through bore can be coated with the coating material layer 14 to encase and reinforce the aperture surface.

Figure 7B:
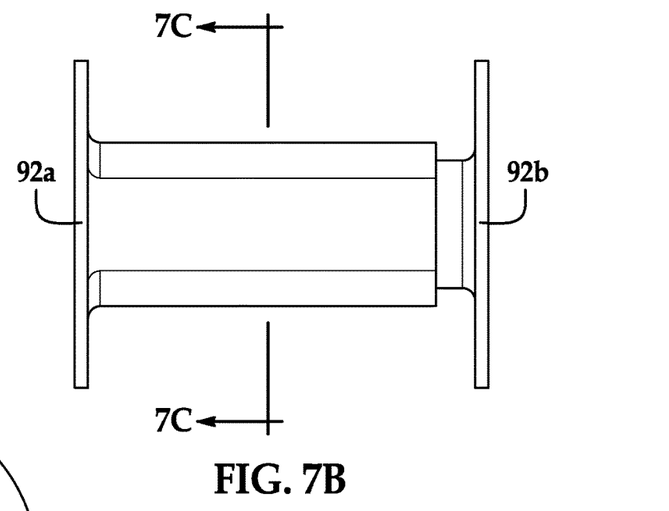
FIGS. 7B-C are a detail view of an embodiment of threaded armor insert employed with the armor panel disclosed herein.
Figure 7C:
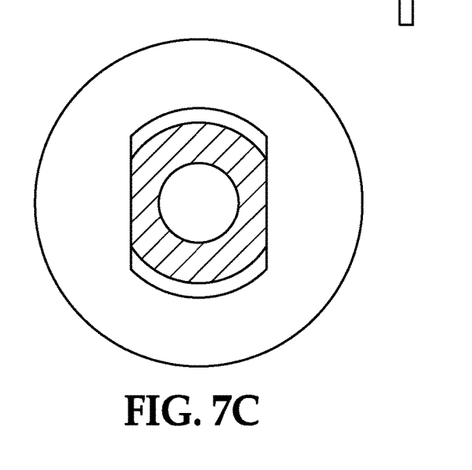

In situations where greater reinforcement is desired, the aperture(s) can be fitted with suitable guards 92. One embodiment of such rivet guards 92 is depicted in FIG. 7B. The rivet guard may be configured as a mating two piece member with a suitable flange element configured to rest on the respective opposed surfaces of the panel member 12. Where desired or required the inner channel surface defined in the rivet guard can be threaded to receive appropriate mating external attachment devices (not shown).

The two pieces of the rivet guard can be joined by any suitable manner such as mating threaded surfaces. The rivet guards can overlay the various coating layers in certain embodiments. However the insertion of rivet interposed between the coating layer and the panel member is contemplated in some embodiments.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed:

1. A blast and/or ballistic resistant construction member comprising:

a substrate panel having a first face and an opposed second face, the substrate panel composed of a friable polymeric material having a low surface energy, wherein the substrate comprises at least one of blast resistance and ballistic resistance characteristics;

at least one substrate panel cap overlying one or more side edges of the substrate panel, the substrate panel cap having an elongated central body and a pair of wall members extending contiguously from opposed edges of the central body;

a cured polymeric coating encasing the substrate panel and the at least one substrate panel cap, the cured polymeric coating being configured to enhance at least one of the blast resistance and ballistic resistance characteristics of the substrate, the cured polymeric coating derived from a polymeric coating composition comprising a reactive blend of at least one first component and at least one second component, wherein the first component consists essentially of a polymer and/or a blend of polymers and the second component is an isocyanate or isocyanate prepolymer;

a skin affixed to the cured polymeric coating in overlying relationship with the first face of the substrate panel, the skin being formed from at least one layer of a polymeric material; and a deformable layer composed of polymeric foam attached to an exterior of the second face of the substrate panel.

2. The blast and/or ballistic-resistant member of claim 1 wherein the substrate panel has side edges interposed between the first and second faces and wherein the polymeric material of the substrate has a surface energy of less than 30 dyne.

3. The blast and/or ballistic resistant member of claim 2 further comprising an intermediate tie layer interposed between the coating layer and the substrate.

4. The blast and/or ballistic resistant member of claim 1, wherein the wall members of the at least one substrate panel cap are connected to regions of the respective first and second faces proximate to the side edge.

5. The substrate panel cap of claim 4 further comprising at least one structure connection member connected to a second side edge of the substrate panel opposed to the connection between the panel cap and the substrate panel.

6. The substrate panel cap of claim 5 wherein the structure connection member includes means for mating attachment with at least one additional substrate panel.

7. The blast and/or ballistic resistant construction member of claim 2 further comprising at least one kick guard, the kick guard attached to at least one face of the substrate panel in overlying relationship wherein the coating composition is interposed between the kick guard and the substrate.

8. The blast and/or ballistic resistant member of claim 2 further comprising at least one laminate layer adhered to at least one face of the substrate panel.

9. The blast and/or ballistic resistant member of claim 3 wherein the intermediate tie layer is a fiber-reinforced polymeric film positioned in overlying relationship with the polymeric coating.

10. The blast and/or ballistic-resistant member of claim 9 further comprising at least one polymeric layer interposed between the polymeric coating and the fiber-reinforced polymeric film, the polymeric layer exhibiting adhesive characteristics.

11. The blast and/or ballistic-resistant member of claim 10 further comprising a primer layer interposed between the polymeric coating and the fiber-reinforced polymeric film.

12. The blast and/or ballistic resistant member of claim 4 wherein the polymeric coating composition is a reactive blend of at least one first component and at least one second component, wherein the first component consists essentially of a polymer and/or a blend of polymers, present in an amount sufficient to impart a predetermined amount of tensile strength, hardness, flexibility and adhesive strength to the cured polymeric coating, composed of at least one of amine-terminated polyetherpolyols, amine-based tetrol polyols and high functional polyols and the second component is an isocyanate or isocyanate quasi-prepolymer.

13. The blast and/or ballistic resistant member of claim 12 wherein the first component is composed of at least one of difunctional amine-terminated polyether polyols having a molecular weight between 400 and 4000, tetrafunctional polyols of alkylene oxide or pentafunctional polyols of alkylene oxide having a molecular weight in the range of 400 to 600.

14. The blast and/or ballistic resistant member of claim 13 wherein the first component is composed of at least one of amine-terminated polypropylene glycol, and alkylene diamine alkylene oxide polyols.

15. The blast and/or ballistic resistant member of claim 14 wherein the second component is an isocyanate component composed of at least one of an aromatic isocyanate and a quasi prepolymer of isocyanate having a percent NCO between about 15 and 25 and wherein the first and second components are admixed in a ratio of between 0.5:1.0 and 1.5:1.0.

16. The blast and/or ballistic resistant member of claim 2 wherein the substrate has a polymeric surface comprising at least one ultrahigh molecular weight polyolefin.

* * * * *